(12) United States Patent
Wansbrough et al.

(10) Patent No.: US 9,792,340 B2
(45) Date of Patent: Oct. 17, 2017

(54) IDENTIFYING DATA ITEMS

(71) Applicant: Metaswitch Networks Ltd, Enfield (GB)

(72) Inventors: Keith Wansbrough, Enfield (GB); Alistair Dundas, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 238 days.

(21) Appl. No.: 14/194,447

(22) Filed: Feb. 28, 2014

(65) Prior Publication Data

US 2014/0181030 A1    Jun. 26, 2014

Related U.S. Application Data

(63) Continuation of application No. PCT/GB2012/052147, filed on Aug. 31, 2012.

(30) Foreign Application Priority Data

Aug. 31, 2011    (GB) .................................. 1115083.6

(51) Int. Cl.
*G06F 17/00*    (2006.01)
*G06F 17/30*    (2006.01)

(52) U.S. Cl.
CPC .. *G06F 17/30575* (2013.01); *G06F 17/30144* (2013.01); *G06F 17/30174* (2013.01)

(58) Field of Classification Search
CPC ......... G06F 17/30575; G06F 17/30144; G06F 17/30174

USPC ......................................................... 707/639
See application file for complete search history.

(56) References Cited

U.S. PATENT DOCUMENTS

| | | | | |
|---|---|---|---|---|
| 5,870,759 A | * | 2/1999 | Bauer | G06F 17/30578 |
| 5,897,640 A | * | 4/1999 | Veghte | G06F 17/30174 |
| 5,958,067 A | * | 9/1999 | Kaneda | G06F 3/0613 |
| | | | | 714/6.1 |

(Continued)

OTHER PUBLICATIONS

Hua, Yu, et al., "SmartStore: A New Metadata Organization Paradigm with Semantic-Awareness for Next-Generation File Systems", SC '09, Portland, OR, Nov. 14-20, 2009, Article 10, 12 pages.*

(Continued)

*Primary Examiner* — Robert Stevens
(74) *Attorney, Agent, or Firm* — EIP US LLP

(57) ABSTRACT

Each of a plurality of data items has an associated update time. Identifying updated data items comprises identifying those data items that have an update time later than a last synchronization time. The data items are updated such that each data item is associated with one of a plurality of update tokens. Each update token is associated with updates performed up to a respective bound period from a time at which the update token is superseded by a successive update token. The update tokens are allocated successively in a monotonic sequence. Data indicating a last synchronization time is received. An update token is identified that is associated with one or more updates performed relative to a point in time related to the last synchronization time by the bound period. Data items having an update time after the last synchronization time are identified on the basis of the identified update token.

24 Claims, 4 Drawing Sheets

(56) References Cited

U.S. PATENT DOCUMENTS

| | | | | |
|---|---|---|---|---|
| 6,065,018 A * | 5/2000 | Beier | G06F 11/1402 | 707/610 |
| 6,101,507 A * | 8/2000 | Cane | G06F 11/1451 | 707/999.201 |
| 6,269,406 B1 * | 7/2001 | Dutcher | G06F 21/41 | 707/999.201 |
| 6,415,280 B1 * | 7/2002 | Farber | G06F 17/30091 | 707/698 |
| 6,574,657 B1 * | 6/2003 | Dickinson | G06F 8/68 | 707/999.001 |
| 6,578,054 B1 | 6/2003 | Hopmann et al. | | |
| 6,874,001 B2 * | 3/2005 | Narang | G06F 17/30551 | |
| 6,925,476 B1 * | 8/2005 | Multer | G06F 17/30144 | |
| 7,320,060 B2 * | 1/2008 | Nakanishi | G06F 11/1458 | 711/114 |
| 7,529,778 B1 * | 5/2009 | Dewey | G06F 11/1451 | |
| 7,769,723 B2 * | 8/2010 | Zheng | G06F 17/30085 | 707/663 |
| 7,860,836 B1 * | 12/2010 | Natanzon | G06F 11/1471 | 707/648 |
| 8,032,860 B2 * | 10/2011 | Piehler | G06F 17/21 | 717/110 |
| 8,291,101 B1 * | 10/2012 | Yan | H04L 67/1095 | 709/230 |
| 2002/0069324 A1 * | 6/2002 | Gerasimov | G06F 11/1456 | 711/114 |
| 2005/0187983 A1 * | 8/2005 | Narang | G06F 17/30551 | |
| 2007/0271317 A1 * | 11/2007 | Carmel | G06F 17/30575 | |
| 2008/0034280 A1 | 2/2008 | Carro | | |
| 2008/0147781 A1 | 6/2008 | Hopmann et al. | | |
| 2009/0313311 A1 * | 12/2009 | Hoffmann | G06F 11/2097 | |
| 2010/0268844 A1 * | 10/2010 | Quinlan | G06F 9/52 | 709/238 |
| 2010/0333116 A1 * | 12/2010 | Prahlad | G06F 17/3002 | 719/328 |
| 2012/0143825 A1 * | 6/2012 | Boehm | G06F 17/30073 | 707/648 |
| 2012/0209808 A1 * | 8/2012 | Tien | H04L 67/1095 | 707/622 |

OTHER PUBLICATIONS

Soules, Craig A. N., et al., "Metadata Efficiency in a Comprehensive Versioning File System", CMU-CS-02-145, Carnegie Mellon Univ. School of Computer Science, Pittsburgh, PA, May 2002, 33 pages.*

Ben Collins-Sussman et al: "Revision Specifiers", Version Control with Subversion (for Subversion 1.6), Aug. 16, 2011 (Aug. 16, 2011), pp. 1-2, XP055051939, Retrieved from the Internet: URL:http://web.archive.org/web/20110816080937/http://svnbook.red-bean.com/en/1.6/svn.tour.revs.specifiers.html [retrieved on Jan. 31, 2013].

International Search Report dated Mar. 7, 2013 issued on related application PCT/GB2012/052147 (published as WO/2013/030595 on Mar. 7, 2013).

Anonymous: "Apache Subversion", Aug. 19, 2011 (Aug. 19, 2011), XP055051924, Retrieved from the Internet: URL:http://de.wikipedia.org/w/index.php?title=Apache_Subversion&oldid=92520247 [retrieved on Jan. 31, 2013] 17 pages, incl. English Abstract.

* cited by examiner

IDENTIFYING DATA ITEMS

CROSS-REFERENCE TO RELATED APPLICATIONS

This application is a continuation of International Application No. PCT/GB2012/052147, filed Aug. 31, 2012 (and published by the International Bureau on Mar. 7, 2013 as International Publication No. WO 2013/030595), which claims priority to GB Application No. GB 1115083.6, filed Aug. 31, 2011. Each of the above-referenced patent applications is hereby incorporated by reference in its entirety.

BACKGROUND OF THE INVENTION

The present application relates to a method and system for identifying data items, in particular but not exclusively for applications that synchronize data items between a plurality of devices.

A number of methods for synchronizing data items cached by a plurality of clients are known. These methods are used in order to propagate changes made to the data items at one device to the caches of the other devices. A frequent problem with such methods for synchronizing data items involves determining which of the items a particular device stores needs to be updated, e.g. in order to synchronize the data items cached at that device with data items stored elsewhere.

One method for determining which data items in the cache of a given device need to be updated is to store on the device the last time at which each data item was updated at the device. The last update time of each data item on the device can then be compared to the last update time of the data items stored elsewhere, and updates to data items on the device (or elsewhere) can then be transmitted to the device (or elsewhere) as appropriate. Unfortunately, as different devices may have different clock times, the last update times recorded on different devices may not accurately reflect the true ordering of updates in some cases.

An alternative is to ensure that only one device records update times using its own clock, however this means that all updates are processed by a central system. If the central system is not able to efficiently determine which updates have been made since a given update time the system may quickly become overburdened due to requests to determine which updates have occurred.

It would be desirable to provide improved methods and apparatus for identifying data items.

SUMMARY

In accordance with a first embodiment, there is provided a method for identifying updated data items in a plurality of data items, wherein each data item in said plurality of data items has an associated update time, wherein identifying updated data items comprises identifying those data items in said plurality that have an update time later than a last synchronization time, and wherein said data items are updated such that each data item is associated with one of a plurality of update tokens, each update token being associated with updates performed up to a respective bound period from a time at which said update token is superseded by a successive update token, update tokens being allocated successively in a monotonic sequence, the method comprising: receiving data indicating a last synchronization time; identifying an update token that is associated with one or more updates performed relative to a point in time related to said last synchronization time by said bound period; and identifying data items having an update time after said last synchronization time on the basis of said identified update token.

In accordance with a second embodiment, there is provided a method for identifying data items in a plurality of data items, wherein each data item in said plurality of data items has an associated aspect, wherein identifying data items comprises identifying those data items in said plurality that have an aspect greater or less than an aspect threshold, and wherein said data items are associated with one of a plurality of tokens, each token being associated with a respective bound limit, tokens being allocated successively in a monotonic sequence, the method comprising: receiving data indicating an aspect threshold; identifying a token that is associated with one or more data items related to said aspect threshold by said bound limit, and identifying data items having an aspect greater or less than said aspect threshold on the basis of said identified token.

In accordance with a third embodiment, there is provided a computer program product comprising a non-transitory computer-readable storage medium having computer readable instructions stored thereon, the computer-readable instructions being executable by a computerized device to cause the computerized device to perform a method for identifying updated data items in a plurality of data items, wherein each data item in said plurality of data items has an associated update time, wherein identifying updated data items comprises identifying those data items in said plurality that have an update time later than a last synchronization time, and wherein said data items are updated such that each data item is associated with one of a plurality of update tokens, each update token being associated with updates performed up to a respective bound period from a time at which said update token is superseded by a successive update token, update tokens being allocated successively in a monotonic sequence, the method comprising: receiving data indicating a last synchronization time; identifying an update token that is associated with one or more updates performed relative to a point in time related to said last synchronization time by said bound period, and identifying data items having an update time after said last synchronization time on the basis of said identified token.

In accordance with a fourth embodiment, there is provided a computer program product comprising a non-transitory computer-readable storage medium having computer readable instructions stored thereon, the computer-readable instructions being executable by a computerized device to cause the computerized device to perform a method for identifying data items in a plurality of data items, wherein each data item in said plurality of data items has an associated aspect, wherein identifying data items comprises identifying those data items in said plurality that have an aspect greater or less than an aspect threshold, and wherein said data items are associated with one of a plurality of tokens, each token being associated with a respective bound limit, tokens being allocated successively in a monotonic sequence, the method comprising: receiving data indicating an aspect threshold; identifying a token that is associated with one or more data items related to said aspect threshold by said bound limit, and identifying data items having an aspect greater or less than said aspect threshold on the basis of said identified token.

In accordance with a fifth embodiment, there is provided an apparatus comprising: at least one processor; and at least one memory including computer program code; the at least one memory and the computer program code being configured to, with the at least one processor, cause the apparatus at least to perform a method for identifying updated data items in a plurality of data items, wherein each data item in said plurality of data items has an associated update time, wherein identifying updated data items comprises identifying those data items in said plurality that have an update time later than a last synchronization time, and wherein said data items are updated such that each data item is associated with one of a plurality of update tokens, each update token being associated with updates performed up to a respective bound period from a time at which said update token is superseded by a successive update token, update tokens being allocated successively in a monotonic sequence, the method comprising: receiving data indicating a last synchronization time; identifying an update token that is associated with one or more updates performed relative to a point in time related to said last synchronization time by said bound period; and identifying data items having an update time after said last synchronization time on the basis of said identified update token.

In accordance with a sixth embodiment, there is provided an apparatus comprising: at least one processor; and at least one memory including computer program code; the at least one memory and the computer program code being configured to, with the at least one processor, cause the apparatus at least to perform a method for identifying data items in a plurality of data items, wherein each data item in said plurality of data items has an associated aspect, wherein identifying data items comprises identifying those data items in said plurality that have an aspect greater or less than an aspect threshold, and wherein said data items are associated with one of a plurality of tokens, each token being associated with a respective bound limit, tokens being allocated successively in a monotonic sequence, the method comprising: receiving data indicating an aspect threshold; identifying a token that is associated with one or more data items related to said aspect threshold by said bound limit, and identifying data items having an aspect greater or less than said aspect threshold on the basis of said identified token.

Further features and advantages will become apparent from the following description of various embodiments, given by way of example only, which is made with reference to the accompanying drawings.

DETAILED DESCRIPTION OF CERTAIN INVENTIVE EMBODIMENTS

Figure 1:
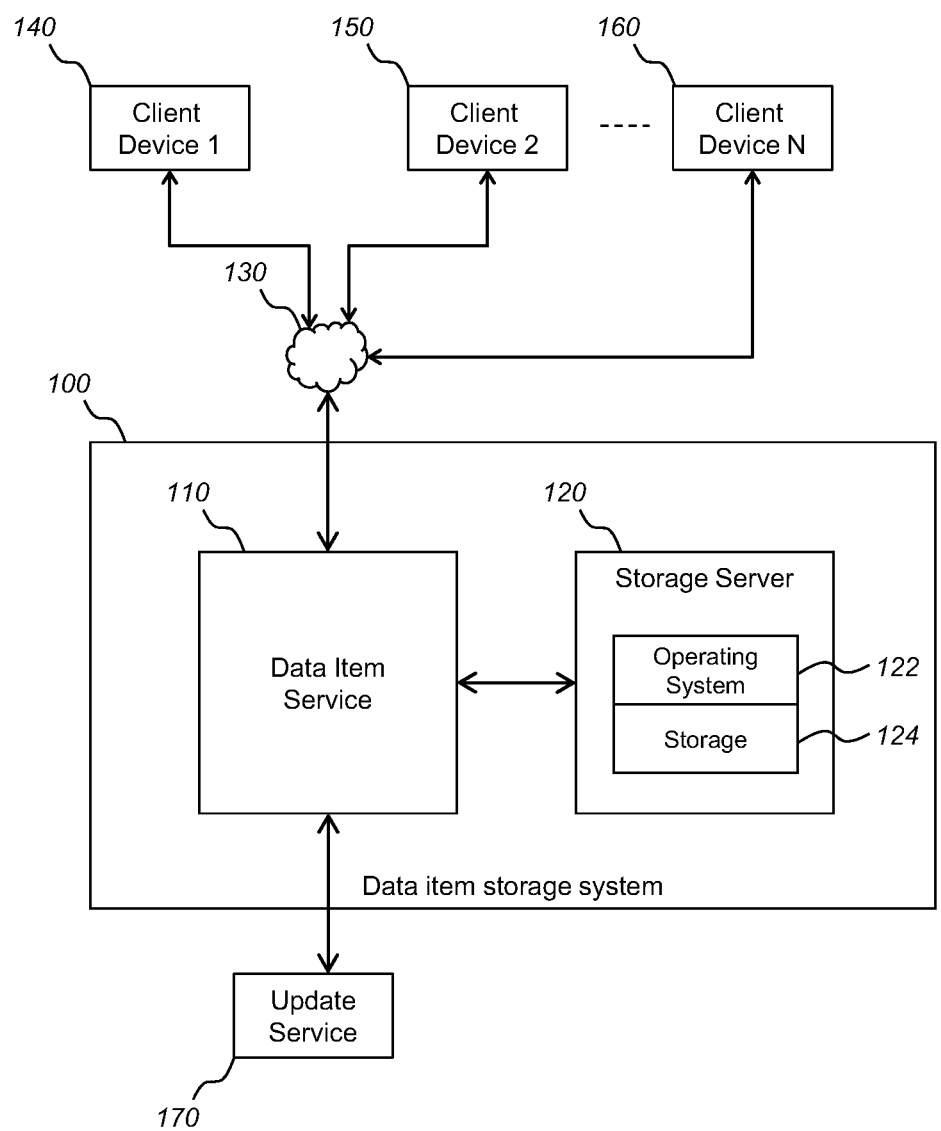
FIG. 1 illustrates a data item storage system, according to various embodiments.

FIG. 1 illustrates a data item storage system 100, according to various embodiments. The data item storage system 100 includes a data item service 110 connected to a storage server 120. The data item service 110 is connected to a communications network 130, for example the Internet. A plurality of client devices 140, 150, and 160 may communicate with the data item service 110 via the communications network 130.

The data item storage system 100 may provide a plurality of data items. These data items may for example be a plurality of files, or a plurality of records in a database, or any other information.

In general, the data item storage service 100 provides a means for synchronizing cached data items held at the client devices 140, 150, and 160. The client devices 140, 150, and 160 may thus cache copies of one or more of the data items stored by the data item storage system 100.

The client devices 140, 150, and 160 may synchronize their cache of data items with the data item storage system 100 by transmitting requests for data item updates to the data item storage service 110 in order to obtain updates to the data items that are cached by the client devices 140, 150, and 160. These updates may for example include new data items and updates to existing data items. The data item update requests may be transmitted from the clients 140, 150, and 160 to the data item service 110 via the communications network 130. Each client 140, 150, and 160 may synchronize its cache of data items when it starts up, and thereafter either periodically or when prompted by the data item storage system 100.

The new data items and updates to existing data items that are stored by the data item storage system 100 may be transmitted to the data item storage system 100 from the client devices 140, 150, and 160, and/or may be transmitted to the data item storage system 100 from an update service 170.

The data item service 110 processes requests for data item update requests received from the client devices 140, 150, and 160. In doing so the data item service 110 may communicate with a storage server 120 in order to store, access and search the data items provided by the data item storage system 100.

The data items are stored in non-volatile storage 124 on the storage server 120 of the data item storage system 100. An operating system 122 running on the storage server provides a file system to organize data stored in the non-volatile storage 124 of the storage server 120. The file system provided by the operating system 122 allows the storage of files within a hierarchy of directories. Each file may include a file name that can be used to identify the file, and file content i.e. the data contained within the file. Each directory may include a directory name that can be used to identify the directory, and may also include other files and/or other directories.

Information about the structure of the file system, i.e. file and directory names, the hierarchy of directories and the files they contain, may be stored separately from the file content of files, e.g. in a form of index. The use of this index allows the operating system 124 to provide fast access to the content of files that are identified to the operating system 124 by their file name and the path to the directory that contains them.

Thus, in response to a request for updates received from a client e.g. client 140, the data item service 110 transmits file system instructions to the operating system 122 of the storage server 120 in order to access stored data items. These file system instructions may relate to file system actions for file and directory creation, modification and deletion, and file searching, reading and writing. The file system instructions may be communicated to the operating system 122 of the storage server 120 using a network file system protocol such as Network File System (NFS) or Server Message Block (SMB).

In response to receipt of file system instructions from the data item service 110, the operating system 122 of the storage server 120 may perform the corresponding file system actions listed above, and may transmit any results of the file system actions such as file content that is read or the results of file searches to the data item service 110.

The data item service 110 may then respond to the request for updates made by the client 140 by transmitting a response to the request back to the client 140. If, for example, the request related to a request for updates in relation to a plurality of data files provided by the data item storage system 100, the data item service 110 may respond to the request by transmitting back one or more of the data items that are read from the storage server 120 once these are received from the operating system 122 of the storage server 120. The data items that are transmitted back to the client 140 by the data item service 110 may include data items that have been updated and/or created since the previous request for updates made by the client 140 was processed by the data item service 110.

In various embodiments, the data item service 110 stores individual data items within separate files in the file system provided by the operating system 122.

Metadata relating to a data item may be included in the file name of the file storing that data item. Additionally, the data item may itself be stored in the file name and/or in the file content of the file storing that data item.

An embodiment of a method performed in order to synchronize the cached data items of a client 140 with those stored by the data item storage service 100 will now be described with reference to FIG. 2.

Initially, the data item service 110 receives a request for updates relating to one or more data items cached by the client device 140 (step 200). The client device 140 may be that of a particular user, and the request may therefore relate to updates to the data items that are stored on behalf of that user by the data item service 100. The request may thus include a user identifier and/or user authentication information in order to identify and/or authenticate the user to the data item service 110.

The request for updates received by the data item service relates to a request for the data item service 110 to provide the client 140 with a list of deltas, i.e., changes that have occurred to the data items stored on behalf of the user of that client 140 since the last such request was processed for the client 140. As will be described in greater detail below, when the client 140 receives the response from the data item service 110, it applies the deltas to its local cache of data items, thus making its local cache of data items identical to those stored by the data item storage service 100.

The request for updates received by the data item service 110 includes a correlator. The correlator records the point at which the previous synchronization of the client device 140 was done (i.e. when the previous request for updates was processed by the data item service 110).

As described in greater detail below, the correlator included in the request for updates was previously received by the client device 140 from the data item service 110 in the previous response to the previous request for updates made by the client 140. The client 140 stored this correlator so that it could be transmitted back to data item service 110 in the next (i.e. current) request for updates.

It should be noted that the client 140 may not need to process the contents of the correlator—it may simply pass it back unchanged to the data item service 110. The data item service 110 can thus place any information it may require during the next synchronization operation into the correlator.

As described above, in various embodiments, each data item is stored in a file within the file system provided by the operating system 122. In this embodiment, each data item may, for example, be stored within the file contents of a file, while metadata, such as a data item identifier, indexing information, etc., may be stored in the file name of that file. New data items are thus deposited by creating new files. Updating a data item is achieved by changing the file contents and/or file name of the corresponding file.

In this embodiment the files that relate to data items stored on behalf of a particular user may all be stored by the data item service 110 within a directory of the file system provided by the operating system 122 that is associated with that user. For example, when a new data item is created on behalf of a given user, the directory associated with that user may be determined, and a file for storing that data item may be created in that directory.

The time (and date) when a data item was last modified may be stored in a last modified attribute of the file that contains that data item. The operating system 122 provides a last modified attribute for each file and directory held in its file system. When a file is created or renamed the last modified attribute of both the file and its containing directory are set by the operating system 122 to the current time known to the operating system 122. For example, the last modified attribute may be the "ctime" attribute provided in NFS.

Therefore, in order to determine the list of deltas i.e. changes that have occurred to the data items stored on behalf of the user, one solution would be for the data item service 110 to compare the last modified attribute of each of the files that relates to a data item stored on behalf of the user with the last update time indicated by the correlator received from the client device 140 (i.e. received in step 200). Any data items which have been modified since the time stored in the correlator can be included in the list of deltas, and those which have not are not included.

Such a straightforward solution would involve the data item service reading the last modified attribute of each file that relates to a data item stored on behalf of the user and comparing it to the correlator time. This is typically very inefficient once the number of files whose last modified attribute is to be read exceeds a certain threshold, as is now explained.

In some cases, a single request (e.g. the "READ-DIRPLUS" command in the NFS file system) may be used by the data item service 110 in order to retrieve the last modified attribute of each file in the directory associated with the user of the client device 140 (i.e. where the data items stored on behalf of that user are stored).

Typically however, this request will only be processed by the operating system 122 if the number of files in the directory is less than a certain threshold. For directories containing more files than this threshold, the data item service 110 may first obtain from the operating system 122 the file names of each file in the directory (e.g. using the "READDIR" command of NFS), and then separately request from the operating system 122 the last modified attribute of each file in the directory (e.g. using the "GETATTR" command of NFS).

In addition, retrieving the last modified time (whether by e.g. a GETATTR or by a READDIRPLUS command) may typically be intrinsically slow as the file name of each file and its last change time are stored in different locations on the storage 124 (e.g. the file name is stored in the directory containing the file whilst the last change time is stored in a metadata location associated with the file).

Consequently the cost of retrieving the last modified attribute for each file has a significant negative effect on both the performance (e.g. due to the overhead of multiple GETATTR requests) and the latency (due to the serialization of those requests) of this straightforward solution for determining the list of deltas to provide to the client 140.

This embodiment provides an alternative to this straightforward solution that reduces, in some cases dramatically, the number of last modified attributes to be examined when the data item service 110 determines the list of deltas for a request for updates. This makes synchronization between clients 140, 150, and 160 and the data item storage system 100 cheaper and faster.

In order to achieve this, in this embodiment each data item stored by the data item storage system 100 is associated with one of a plurality of update tokens. In this embodiment the update token associated with a given data item is stored along with other metadata relating to the data item in the file name of the file that stores that data item. Each update token is chosen so that the list of deltas for a given update request can typically be determined after reading the last modified attributes of only a subset of the files that contain data items for the given user.

In this embodiment, the plurality of data items stored on behalf of a particular user are associated with a sequence of update tokens. Thus the data items of different users may be associated with different sequences of update tokens.

The sequence of update tokens associated with a given user may in this embodiment be monotonic. For example, each update token in a given sequence may be a number that has a value that is greater than or equal to that of the previous update token in the sequence. It should be noted that a given sequence of update tokens need not be strictly monotonic e.g. strictly increasing.

In this embodiment, data items stored on behalf of a given user are updated such that, whenever a data item is added or updated, the data item is associated with one of the update tokens in the sequence of update tokens associated with that user. As time passes, new update tokens are added to the sequence of update tokens, and updates to data items cause those data items to be associated with newer tokens in the sequence of update tokens.

A bound period is defined for the updates that are associated with each update token. Each update token is associated with updates performed (to data items of the associated user) up to a respective bound period from a time at which the update token is superseded by a successive update token.

For example, this means that a first update token is superseded by a second update token (i.e. the next token in the sequence for the associated user) at a first time. Updates associated with the first update token may be performed up to a bound period after the first time, e.g. up to 60 seconds after the first time. Once the bound period after the first time has passed, no more updates may be associated with the first update token.

Thus whenever a data item is updated (i.e. updated or created) the data item is associated with an update token in the sequence of update tokens whose time bound has not expired.

The update token associated with each data item may thus provide a bounded approximation to the last modified time of each data item.

Figure 3:
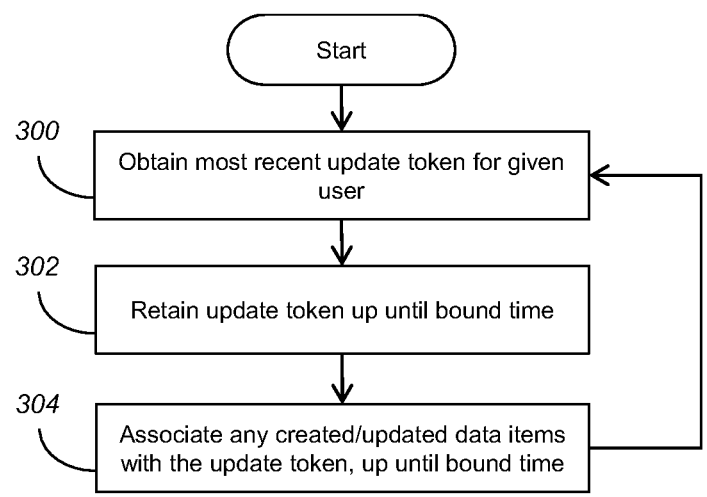
FIG. 3 illustrates steps performed in order to store updates to data items, according to various embodiments.
Figure 4:
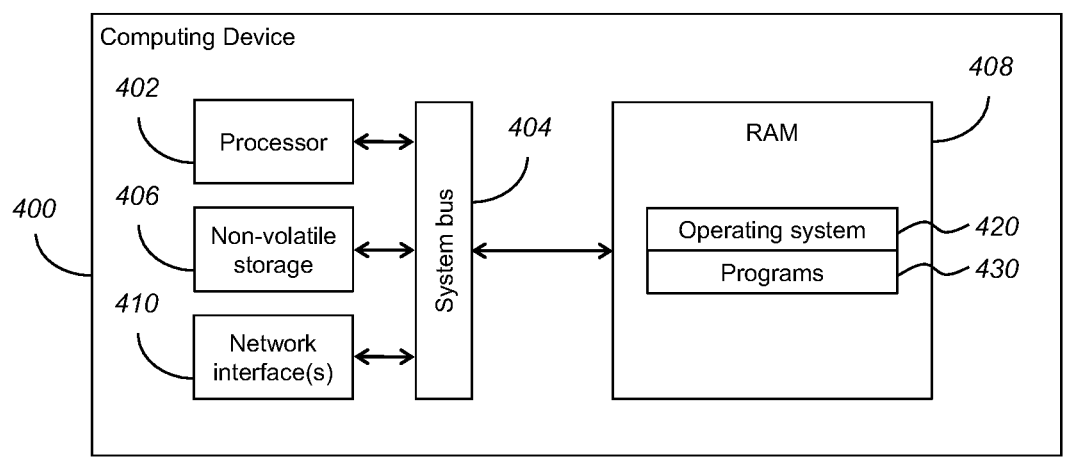
FIG. 4 schematically illustrates components of a computing device, according to various embodiments.

In order to store an update in relation to one of the data items of a given user (e.g. user "AAA"), the data item service 110 performs the following steps, described with reference to FIG. 3.

Initially the data item service 110 obtains the update token that has been most recently created for data items of user AAA (step 300).

In this embodiment, the most recently created update token for user AAA may be stored by the data item service 110 in a file of the file system provided by the operating system 122. The data item service 110 may therefore obtain the most recently created update token by reading it from the file in which it is stored.

In this embodiment, the sequence of update tokens associated with user AAA is generated by using the identifier of the next new data item of user AAA as the value of each new update token. For example, the identifiers of data items may be numbers that are allocated sequentially for each new data item belonging to user AAA. The identifier of the next new data item of user AAA may be stored in a file provided by the operating system 122, and may be read and then incremented whenever a new data item is created for user AAA. The next new data item identifier of user AAA may therefore be read in step 300 when the update token that has been most recently created for user AAA is obtained (though the next new data item identifier is not incremented in step 300, i.e. it is only incremented when a new data item is created).

The data item service 110 then retains the update token it has obtained, up until the expiration of the bound period (step 302). For example, if the bound period is 60 seconds, the data item service 110 will retain the update token for 60 seconds.

If the data item service 110 is instructed to create or update any data items before the expiration of the bound period, the data item service 110 will associate the created/updated data items with the update token it has obtained (step 304).

If, for example, the data item service 110 is instructed to create a new data item for user AAA, the data item service 110 will create a file in the directory associated with user AAA. The file contents of the file are used to store the data item, whilst the file name of the file is used to store metadata relating to the data item, including the update token with which the data item is associated (i.e. the update token obtained by the data item service 110 in step 300). Similarly if a data item is updated the file name of the file containing that data item is updated to include the update token with which the data item is associated (i.e. the update token obtained by the data item service 110 in step 300).

Once the bound period has expired, the data item service 110 returns to step 300, i.e. it once again obtains the most recent update token. Note that if no new data items have been created then in this embodiment the next data item identifier will not have been incremented and the same most recent update token may thus be obtained in successive iterations of step 300.

Returning now to the steps taken to synchronize the cached data items of a client 140 with those stored by the data item storage service 100 (i.e. the steps of FIG. 2), this embodiment uses the update tokens associated with data items in order to help determine the list of deltas, i.e. changes that have occurred to the data items stored on behalf of the user, when processing a request for updates to data items received from a client device 140.

Thus, in this embodiment, in order to process the request for data item updates received in step 200, the data item service 100 will first retrieve the update token associated with each of the data items of the given user (step 202). As described above the update token of each data item of a given user is stored in the file name of the file containing that data item. Additionally, each file containing a data item of a given user is stored within a directory of the file system provided by the operating system 122 that is associated with that user.

Therefore in this embodiment the data item service 110 retrieves the update token associated with each of the data items of the given user by reading the file names of all of the files in the directory that is associated with the user. This may be done by the data item service transmitting a READ-DIR command (via NFS) specifying the appropriate directory to the operating system 122 and retrieving all the file names from the operating system's 122 response to that command. Retrieving all the file names in a directory using e.g. the READDIR command is a relatively quick operation compared to retrieving last modified attributes using e.g. the GETATTR command.

Once the data item service 110 has retrieved the update token associated with each data item, it may process the retrieved data items on the basis of their respective update token (step 204).

The data item service 110 may do this processing in order to identify an update token that is associated with one or more updates performed relative to a point in time related to a last synchronization time by the bound period. In this embodiment the last synchronization time may be the correlator time i.e. the time that a request for updates for the client 140 was last processed, as specified by the correlator that the data item service 110 received from the client device 140 in step 200.

Thus the data item service 110 tries to identify an update token that is associated with updates performed relating to a point in time related to the correlator time by the bound period, i.e. the point in time that is the correlator time plus or minus the bound period.

The update token may be associated with updates performed relating to that point in time in that at least one of the updates is performed before that point in time, or in that at least one of the updates is performed after that point in time.

Thus the processing of the data items on the basis of their respective update token may be performed in a number of ways. In this embodiment a particular way in which the data items will be processed is described. Alternative embodiments that are described later will illustrate alternative ways of processing the data items in step 204.

In this embodiment, the data items are processed on the basis of their update tokens in order to identify a first update token that is associated with at least one update before the above point in time. In this embodiment, the above point of time is the correlator time minus the bound period, i.e. the point in time that is e.g. 60 seconds before the correlator time.

Figure 2:
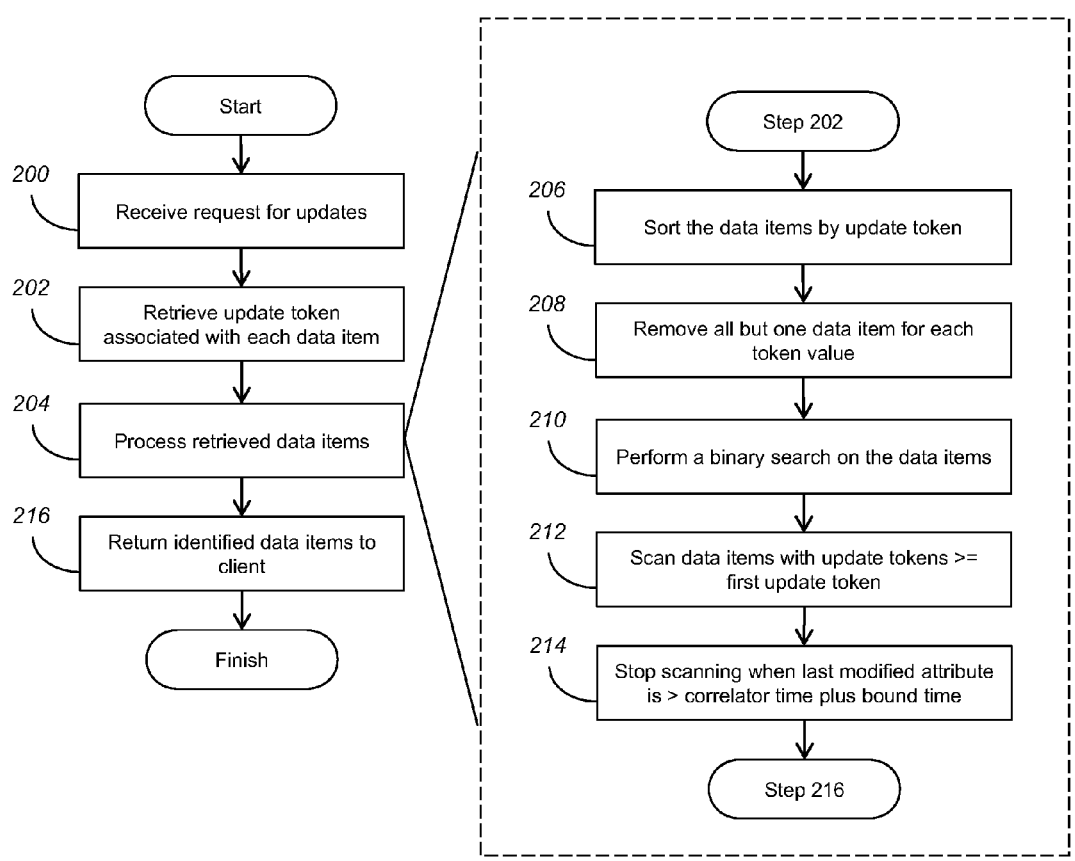
FIG. 2 illustrates steps performed in order to determine one or more data items that have been updated since a last synchronization time, according to various embodiments.

The steps taken by the data item service 110 in order to process the retrieved data items on the basis of their respective update token will now be broken down into sub-steps (206 to 214, shown in FIG. 2).

Initially, the data item service 110 sorts the data items according to their update token (step 206). As described above, in this embodiment update tokens are monotonic, increasing values. The data item service 110 therefore sorts the data items in increasing order.

Once the data items have been sorted on the basis of their update token, the data item service 110 prunes the sorted data items by removing from the sorted list all but one data item for each update token value (step 208). Thus, if there are two or more data items with the same update token value, all but one of those data items is removed from the sorted list in order to create the pruned list of sorted data items. This is done for each data item value in the list.

In order to identify the first update token, the data item service 110 conducts a form of binary search on the pruned list of sorted data items (step 210).

An ordinary binary search on the pruned list of sorted data items will not work however (even on the sorted data items before pruning), because the update token values give only an approximate ordering on the last modified attribute of each data item: each update token may deviate from the last modified attribute order by as much as the bound period. This is addressed by adding a scanning phase after the search to discover and handle out-of-last-modified-order data items that are near the correlator time, as will later be described in greater detail.

The data item service 110 performs a binary search on the pruned list of sorted data items in order to find the data item in the pruned list that has the latest last modified attribute that is before the correlator time minus the bound period. This may be done iteratively, by the data item service 110 eliminating from the search approximately half of the remaining items in the pruned list at each iteration.

At each iteration, the data item service 110 retrieves, using the operating system 122 (e.g. GETATTR command), the last modified attribute of a selected data item, e.g. the one in the middle of the remaining entries in the pruned, sorted list. The data item service 110 compares the last modified attribute of the selected data item to the correlator time minus the bound period.

If the last modified attribute is less than the correlator time minus the bound period, the data item service 110 can eliminate from the search all the data items in the pruned list with update tokens less than that of the selected data item.

If the last modified attribute is greater than the correlator time minus the bound period, the data item service 110 can eliminate from the search all the data items in the pruned list with update tokens greater than that of the selected data item.

Eventually, the data item service 110 reduces the pruned list to one data item, which will be the data item that has the latest last modified attribute that is before the correlator time minus the bound period. The update token of this data item is the first update token defined above, i.e. an update token that is associated with at least one update before the correlator time minus the bound period.

As the first update token is associated with a data item that has the latest last modified attribute that is before the correlator time minus the bound period, it may be determined that all data items of the given user that are associated with update tokens that have values that are less than that of the first update token relate to data items that have last modified attributes that are before the correlator time.

Thus, the data item service 110 can determine that all data items having update tokens preceding the first update token have an associated update time before the correlator time. These data items have therefore not been updated since the last synchronization of the client 140 with the data item service 110, and therefore no information in relation to these data items needs to be returned to the client 140 by the data item service 110.

It should be noted that in order to identify the first update token, the data item service 110 may need to identify a second update token, which is adjacent to the first update token in the sequence of update tokens and is associated with at least one update that is after the correlator time minus the bound period. By identifying the first and second update tokens, the data item service 110 can be sure that the data item in the pruned, sorted list that has the first update token is the data item in that list with the latest update time before the correlator time minus the bound period.

Once the first update token has been identified, the data item service 110 performs the scanning phase summarized above in order to discover and handle out-of-last-modified-order data items that are near the correlator time. The data item service 110 does this by, in this embodiment, testing the last modified attribute of each data item in the sorted (but not pruned) list that has an update token that is greater than or equal to the first update token (step 212).

For each data item in the sorted list, the data item service 110 retrieves the last modified attribute of the data item using the operating system 122 (e.g. GETATTR command). The data item service 110 then compares the retrieved last modified attribute to the correlator time (note: not the correlator time minus the bound period) in step 210 above.

If the retrieved last modified attribute is greater than the correlator time, the corresponding data item has been updated since the last synchronization of the client 140 with the data item service 110. As a result, information relating to the corresponding data item is returned to the client 140.

If the retrieved last modified attribute is less or equal to the correlator time, the corresponding data item has not been updated since the last synchronization of the client 140 with the data item service 110. As a result, information relating to the corresponding data item does not need to be returned to the client 140.

The data item service 110 proceeds in this way for all data items with update tokens greater than or equal to the first update token. The data item service 110 may do this for each such data item in the order indicated by the list of sorted data items (before pruning in step 208).

If, while scanning the data items in step 212 as just described, the data item service 110 identifies a data item that has a last modified attribute that is greater than the correlator time plus the bound period, the data item service 110 may determine that that all data items that have update tokens after the update token of this identified item have an update time after the correlator time (step 214). As a result information relating to all of the data items that have update tokens after the update token of this identified item may need to be returned to the client 140 (notably, without making individual GETATTR commands to read the last modified attribute of each of these identified items). Additionally, the data item service 110 can stop scanning once it has scanned all the data items that have update tokens less than that of this identified token.

Once the data items that have a last modified attribute after the correlator time (i.e. that were updated after the correlator time) have been identified, information relating to these data items may be transmitted by the data item service 110 to the client 140 (step 216). The data item service 110 may retrieve information relating to each identified data item, for example by retrieving the file contents of the file containing that data item using the operating system 122. The data item service 110 may transmit this information to the client 140 in a response to the request for data item updates (i.e. the request received in step 200).

The response to the request for data item updates that is transmitted to the client 140 by the data item service 110 may include a new correlator, for use by the client in a subsequent request for data item updates, as described above. The correlator time of the new correlator may be the time of the last update to any of the data items of the given user, i.e. the latest last modified attribute of the files that contain the data items of the given user. The latest last modified attribute of the files that contain the data items of the given user may be obtained from the last modified attribute of the directory containing those files. In this way, the new correlator records the time to which the client 140 was last updated, which can later be used in a subsequent synchronization of the client.

By using the form of binary search to identify the first update token described above, the number of requests for the last modified attributes of files in the file system provided by the operating system 122 may be reduced over the straightforward implementation described above.

For example, on a directory of N files, the number of requests is reduced from 1+N to $1+\log_2(N)+k$, where k depends upon the bound period and the rate at which new update tokens with new values are created. A typical scenario might have N=150 and k=5, in which case the number of requests per synchronization operation is reduced from 151 to 14.

It should be noted that any monotonic quantity can be used for determining the next update token. Although the quantity need not be strictly monotonic, if it increases significantly less often than data items are updated or created then performance is reduced.

Furthermore, by providing a bound period within which updates relating to a given update token may be made, there is no requirement to obtain the latest update token atomically with data item file creation or update, thus simplifying the implementation. This allows a plurality of processes, e.g. a plurality of data item services 110 and/or update services 170, each creating new data items and updating data items, to operate independently of each other, while allowing the operating system 122 to record the most recent update times of data items according to its own clock so that data item updates performed after a given time may be correctly determined by the data item service 110 (or plurality of such services). It should be noted that embodiments that include a plurality of data item services 110 are envisioned, and further details on such embodiments are later described.

A formal proof of the algorithm described above is now given. In the following example, multiple processes update data items according to the following steps (see FIG. 3):

1. Read the monotonic quantity in order to obtain the current update token at time $s_{ij}$, yielding the update token i (step 300). The quantity increases monotonically (but not strictly), where s (i.e. time) increases strictly monotonically.
2. Sleep for an arbitrary period in $d_{ij}$ in [0,D], where D is the bound period (step 302). This models the fact that some time is taken before an update is performed, during which the quantity may change and/or other processes may read it.
3. Record the update token i as the update token of a data item that is updated or created at time $ti_{ij}=s_{ij}+d_{ij}$ (step 304).

When a request for data item updates is processed, the data item service 110 is given a correlator time C (received from a client 140) and a collection of $(i,t_{ij})$ pairs (i.e., update tokens and last modified attributes from the operating system 122). It may find all pairs such that $t_{ij}>C$, while examining as few $t_{ij}$ values as possible. The bound period is given by D. If there are no pairs supplied, return no pairs. Otherwise proceed as follows:

1. Sort the pairs in order by i (i.e. update token).
2. Pick out one pair of each i (i.e. update token).
3. Do a binary search on this array for $ti_{ij}>T=C-D$, as follows:

a. Set low=the smallest i, and high=the greatest i.
b. While there exists mid such that low<mid<high:
  i. Test $t_{mid,j}$ vs T:
    1. If $t_{mid,j} \leq T$, set low:=mid
    2. Otherwise $t_{mid,j} > T$; set high:=mid
4. Scan all pairs $(k,t_{kh})$ where k≥low:
  a. if $t_{kh} > C$, include, else exclude
  b. if $t_{kh} \geq C+D$, stop comparing at the end of the (k,_) pairs, and include all subsequent pairs (we know that $t_{mn} > C$ for all m>k and all n).

Lemma: For all i,j,h,k, if j>i then $s_{jh} > s_{ik}$ (since s increases strictly monotonically and i and j increase monotonically).
<=>$t_{jh} - d_{jh} > t_{ik} - d_{ik}$
<=>$t_{jh} > t_{ik} + d_{jh} - d_{ik}$
=>$t_{jh} > t_{ik} - D$
<=>$t_{jh} + D > t_{ik}$ Invariant: For all i, (1) if i<low, then for all h, $t_{ih} < T+D$; (2) if i>high, then for all h, $t_{ih} > T-D$.

Base: (1) and (2) both vacuously true, since there are no values of i<low or i>high.

Induction (Loop):
If $t_{mid,j} \leq T$, then
  For all k<mid, for all h, $t_{kh} < t_{mid,j} + D$ (by lemma), ≤T+D (by assumption), which satisfies (1) for i<mid.
  (2) is unchanged.
If $t_{mid,j} > T$, then
  For all k>mid, for all h, $t_{kh} > t_{mid,j} - D$ (by lemma), >T-D (by assumption), which satisfies (2) for i>mid.
  (1) is unchanged.

Termination: same as for the usual binary search—always shrink the search range.

Application: by (1), for all i<low and for all h, $t_{ih} < T+D = C$. So these i can be excluded.

Once a k is identified such that there exists an h where $t_{kh} > C+D$, it is known that for all m>k and for all n, $t_{mn} > t_{kj} - D > C$ (by lemma). So these i can be included.

The processing of a request for data item updates by the data item service 110 will now be illustrated.

Consider a directory associated with a given user, the directory containing the following nine files, each relating to a different data item. Each file has been deposited in the order shown. The file name of each file is shown in the left hand column of the table below, which is in the format "M<data item identifier>.--.<update token>". Note that the ".--." part of each file name relates to flags for the data item that are stored in the file name, e.g. where the first "-" character may be a "R" if the data item has been 'read' and the second "-" character may be a "F" if the data item has been marked as a 'favourite'. The last update time i.e. last modified attribute of each file is listed next to each file, in the right hand column below. In this example a bound period of 60 seconds is used.

| | |
|---|---|
| M01.--.01 | 2011-08-10 18:00:01 |
| M02.--.02 | 2011-08-10 18:05:23 |
| M03.--.03 | 2011-08-10 18:59:50 |
| M04.--.04 | 2011-08-10 23:30:10 |
| M05.--.05 | 2011-08-11 08:05:20 |
| M06.--.06 | 2011-08-11 13:23:14 |
| M07.--.07 | 2011-08-11 19:15:10 |
| M08.--.08 | 2011-08-12 12:01:20 |
| M09.--.09 | 2011-08-12 14:22:45 |

At this point, the next data item identifier is 10.

Next, data item 2 is marked as 'read' (e.g. it may correspond to an email) by changing its file name as shown, and data item 10 is created. An updated listing of the directory is shown below.

| | |
|---|---|
| M01.--.01 | 2011-08-10 18:00:01 |
| M02.R-.10 | 2011-08-12 14:15:32 |
| M03.--.03 | 2011-08-10 18:59:50 |
| M04.--.04 | 2011-08-10 23:30:10 |
| M05.--.05 | 2011-08-11 08:05:20 |
| M06.--.06 | 2011-08-11 13:23:14 |
| M07.--.07 | 2011-08-11 19:15:10 |
| M08.--.08 | 2011-08-12 12:01:20 |
| M09.--.09 | 2011-08-12 14:22:45 |
| M10.--.10 | 2011-08-12 14:23:30 |

At this point, the next data item identifier is 11.

Next a synchronization operation is performed by a client, i.e. the client is updated so that its cache of the data items is synchronized with that of the data item storage system 100. The data item service 110 transmits to the client in its response to the request for data item updates a new correlator, which is set to the most recent last modified attribute of the files that contain the data items, i.e., 2011-08-12 14:23:30, that of data item 10.

Next, data item 8 is marked as 'read', and, sometime later, the following changes to the data items take place: data item 11 is created, data item 12 is created, data item 4 is marked as 'favourite', data item 5 is marked as 'read'. Below is the resulting listing of the directory. Notice that the update token recorded for data item 8 is out of (last modified time) order, i.e. it is update token 9, which was the value of the update latest token 51 seconds earlier. This is possible as it is within the 60 second time bound.

| | |
|---|---|
| M01.--.01 | 2011-08-10 18:00:01 |
| M02.R-.10 | 2011-08-12 14:15:32 |
| M03.--.03 | 2011-08-10 18:59:50 |
| M04.-F.13 | 2011-08-12 20:17:20 |
| M05.R-.13 | 2011-08-13 09:00:48 |
| M06.--.06 | 2011-08-11 13:23:14 |
| M07.--.07 | 2011-08-11 19:15:10 |
| M08.R-.09 | 2011-08-12 14:23:55 |
| M09.--.09 | 2011-08-12 14:22:45 |
| M10.--.10 | 2011-08-12 14:23:30 |
| M11.--.11 | 2011-08-12 15:50:32 |
| M12.--.12 | 2011-08-12 17:31:03 |

At this point, the next data item identifier is 13.

Next a second synchronization operation is performed by the same client. The correlator obtained by the client in the first synchronization operation is thus returned to the data item service 110.

Without using the above embodiment (i.e. using instead the straightforward implementation described above), the directory would be scanned to obtain a list of file names, and then the last modified time of each data item (i.e. of its corresponding file) would be retrieved and each time compared to the correlator time i.e. 2011-08-12 14:23:30. This involves 13 operations on the operating system 122 file system (1 directory scan plus 12 last modified attribute retrievals) and returns 5 files: 4, 5, 8, 11, 12.

In contrast, after scanning the directory the data item service 110 proceeds as follows.

First it sorts the data items by update token (step 206) and prunes the sorted file names (step 208), i.e. picks one data item to represent each update token value. The list below shows each data item in the sorted, pruned list in the left column, with pruned data items in the right column.

```
M01.--.01
M03.--.03
M06.--.06
M07.--.07
M08.R-.09        (M09.--.09)
M10.--.10        (M02.R-.10)
M11.--.11
M12.--.12
M04.-F.13        (M05.R-.13)
```

Next the data item service 110 performs a binary search on the sorted, pruned list (step 210). This is done in order to find the data item in the pruned list that has the latest last modified attribute that is before the correlator time C minus the bound period D, i.e. T=C−D, T=2011-08-12 14:22:30. The update token of this data item is the first update token. This binary search tests the last modified attributes of data items 8, 6, and 7 only in 3 iterations:

Iteration 1:

```
M01.--.01        low
M03.--.03
M06.--.06
M07.--.07
M08.R-.09        mid: 2011-08-12 14:23:55 > T
M10.--.10
M11.--.11
M12.--.12
M04.-F.13        high
```

Iteration 2:

```
M01.--.01        low
M03.--.03
M06.--.06        mid: 2011-08-11 13:23:14 ≤ T
M07.--.07
M08.R-.09        high
M10.--.10
M11.--.11
M12.--.12
M04.-F.13
```

Iteration 3:

```
M01.--.01
M03.--.03
M06.--.06        low
M07.--.07        mid: 2011-08-11 19:15:10 ≤ T
M08.R-.09        high
M10.--.10
M11.--.11
M12.--.12
M04.-F.13
```

Result:

```
M01.--.01
M03.--.03
M06.--.06
M07.--.07        first update token is 7
M08.R-.09
M10.--.10
M11.--.11
M12.--.12
M04.-F.13
```

Next the data items in the sorted (but not pruned) list, starting from the data items with the first update token, are scanned (step 212). The last modified attribute of each data item that is scanned is read and compared to the correlator time i.e. C=2011-08-12 14:23:30. Once a data item with last modified time greater than or equal to C+D, i.e. 2011-08-12 14:24:30, is found, no data items with update tokens greater than or equal to the update token of that data item need to be scanned (step 214) as they can all be assumed to have update times after the correlator time C. Thus data items 7, 8, 9, 10, 2 and 11 are scanned. Note that the last modified attributes of data items 7 and 8 may be cached from when they were read in step 210.

```
M01.--.01                                (exclude)
M03.--.03                                (exclude)
M06.--.06        2011-08-11 13:23:14     (exclude)
M07.--.07        2011-08-11 19:15:10     ≤C
M08.R-.09        2011-08-12 14:23:55     >C
M09.--.09        2011-08-12 14:22:45     ≤C
M10.--.10        2011-08-12 14:23:30     ≤C
M02.R-.10        2011-08-12 14:15:32     ≤C
M11.--.11        2011-08-12 15:50:32     >C, >C +D
M12.--.12                                (include)
M04.-F.13                                (include)
M05.R-.13                                (include)
```

The result is that data items 8, 11, 12, 4, 5, have been updated, and information relating to these data items is returned by the data item service 110 to the client along with a new correlator with the correlator time 2011-08-13 09:00:48, i.e. that of data item 5 which had the most recent last update time (step 216).

Thus, on a directory containing 12 data items, using the straightforward implementation described above involves 13 operations using the operating system 122. The embodiment above instead involves only 8 operations using the operating system 122 (the directory scan plus 7 last modified attribute retrievals), and still returned the same result. The data item service 110 retrieves the last modified attributes of only approximately $\log_2(N)$ files from the directory, plus a few other files that have last modified times close to the received correlator time. In this small directory a speedup of 38% is achieved. For larger directories the speedup is even more significant.

In accordance with some embodiments, a method for identifying updated data items in a plurality of data items is provided. Each data item in the plurality of data items has an associated update time. Identifying updated data items comprises identifying those data items in the plurality that have an update time later than a last synchronization time. The data items are updated such that each data item is associated with one of a plurality of update tokens, each update token being associated with updates performed up to a respective bound period from a time at which the update token is superseded by a successive update token. Update tokens are allocated successively in a monotonic sequence. Data indicating a last synchronization time is received. An update token that is associated with one or more updates performed relative to a point in time related to the last synchronization time by the bound period is identified. Data items having an update time after the last synchronization time are identified on the basis of the identified update token.

By identifying an update token that is associated with one or more updates performed relative to a point in time related to the last synchronization time by the bound period, the update token associated with each data item can be used as a bounded approximation of the last update time of each data item. This method can provide a significant reduction in the number of data items whose last update time are to be read (and compared to the above point in time), in comparison to a straightforward implementation where the last update time of each data item is read.

In applications where the last update time of each data item may be costly (e.g. computationally, or otherwise) to read, this method provides a significant reduction in the cost of identifying the data items that have been updated since the last synchronisation time. An example of such an application is one where the data items are files and the last update time of each file is stored in the last modified attribute of each file, which is provided by a file system. Reading the last modified attribute of a file may typically be a costly operation in comparison to reading the name of the file, for example. Therefore in some embodiments the update token associated with each file is stored in the file name of the file.

In some embodiments, the update token may enable the inclusion or exclusion of some of the data items from the identified items.

For example, some embodiments may include identifying an update token associated with at least one update performed after a point in time following the last synchronization time by the bound period and identifying, on the basis of this update token, that all data items having update tokens greater than or equal to this update token have an update time after the last synchronization time. Thus, in these embodiments the update token may enable the inclusion of all the data items with update tokens greater than or equal to the identified update token, without the need for reading the last update time of many, or in some cases any, of those data items.

In another example, some embodiments may include identifying an update token associated with at least one update performed before a point in time preceding the last synchronization time by the bound period and identifying, on the basis of this update token, that all data items having update tokens less than or equal to this update token have an update time before the last synchronization time. Thus, in these embodiments the update token may enable the exclusion of all the data items with update tokens less than or equal to the identified update token, without the need for reading the last update time of many, or in some cases any, of those data items.

In accordance with some embodiments, a method for identifying data items in a plurality of data items is provided. Each data item in the plurality of data items has an associated aspect. Identifying data items comprises identifying those data items in the plurality that have an aspect greater or less than an aspect threshold. The data items are associated with one of a plurality of tokens, each token being associated with a respective bound limit. Tokens are allocated successively in a monotonic sequence. Data indicating an aspect threshold is received. A token that is associated with one or more data items related to the aspect threshold by the bound limit is identified. Data items having an aspect greater or less than the aspect threshold are identified on the basis of the identified token.

In accordance with some embodiments, a computer program product comprising a non-transitory computer-readable storage medium having computer readable instructions stored thereon is provided. The computer-readable instructions are executable by a computerized device to cause the computerized device to perform a method for identifying updated data items in a plurality of data items, wherein each data item in the plurality of data items has an associated update time. Identifying updated data items comprises identifying those data items in the plurality that have an update time later than a last synchronization time. The data items are updated such that each data item is associated with one of a plurality of update tokens, each update token being associated with updates performed up to a respective bound period from a time at which the update token is superseded by a successive update token. Update tokens are allocated successively in a monotonic sequence. The method for identifying updated data items comprises receiving data indicating a last synchronization time, identifying an update token that is associated with one or more updates performed relative to a point in time related to the last synchronization time by the bound period, and identifying data items having an update time after the last synchronization time on the basis of the identified token.

In accordance with some embodiments, a computer program product comprising a non-transitory computer-readable storage medium having computer readable instructions stored thereon is provided. The computer-readable instructions are executable by a computerized device to cause the computerized device to perform a method for identifying data items in a plurality of data items, wherein each data item in the plurality of data items has an associated aspect. Identifying data items comprises identifying those data items in the plurality that have an aspect greater or less than an aspect threshold. The data items are associated with one of a plurality of tokens, each token being associated with a respective bound limit. Tokens are allocated successively in a monotonic sequence. The method for identifying data items comprises receiving data indicating an aspect threshold, identifying a token that is associated with one or more data items related to the aspect threshold by the bound limit, and identifying data items having an aspect greater or less than the aspect threshold on the basis of the identified token.

In accordance with some embodiments, an apparatus for identifying updated data items in a plurality of data items is provided. Each data item in the plurality of data items has an associated update time. Identifying updated data items comprises identifying those data items in the plurality that have an update time later than a last synchronization time. The data items are updated such that each data item is associated with one of a plurality of update tokens, each update token being associated with updates performed up to a respective bound period from a time at which the update token is superseded by a successive update token. Update tokens are allocated successively in a monotonic sequence. The apparatus comprises means for receiving data indicating a last synchronization time, means for identifying an update token that is associated with one or more updates performed relative to a point in time related to the last synchronization time by the bound period, and means for identifying data items having an update time after the last synchronization time on the basis of the identified token.

In accordance with some embodiments, an apparatus is provided. The apparatus comprises at least one processor and at least one memory including computer program code. The at least one memory and the computer program code are configured to, with the at least one processor, cause the apparatus at least to perform a method for identifying updated data items in a plurality of data items. Each data item in the plurality of data items has an associated update time. Identifying updated data items comprises identifying those data items in the plurality that have an update time later than a last synchronization time. The data items are updated such that each data item is associated with one of a plurality of update tokens, each update token being associated with updates performed up to a respective bound period from a time at which the update token is superseded by a successive update token. Update tokens are allocated successively in a monotonic sequence. The method for identifying updated data items comprises receiving data indicating a last synchronization time, identifying an update token that is associated with one or more updates performed relative to a point in time related to the last synchronization time by the bound period, and identifying data items having an update time after the last synchronization time on the basis of the identified update token.

In accordance with some embodiments, an apparatus for identifying data items in a plurality of data items is provided. Each data item in the plurality of data items has an associated aspect. Identifying data items comprises identifying those data items in the plurality that have an aspect greater or less than an aspect threshold. The data items are associated with one of a plurality of tokens, each token being associated with a respective bound limit. Tokens are allocated successively in a monotonic sequence. The apparatus comprises means for receiving data indicating an aspect threshold, means for identifying a token that is associated with one or more data items related to the aspect threshold by the bound limit, and means for identifying data items having an aspect greater or less than the aspect threshold on the basis of the identified token.

In accordance with some embodiments, an apparatus is provided. The apparatus comprises at least one processor and at least one memory including computer program code. The at least one memory and the computer program code are configured to, with the at least one processor, cause the apparatus at least to perform a method for identifying data items in a plurality of data items. Each data item in the plurality of data items has an associated aspect. Identifying data items comprises identifying those data items in the plurality that have an aspect greater or less than an aspect threshold. The data items are associated with one of a plurality of tokens, each token being associated with a respective bound limit. Tokens are allocated successively in a monotonic sequence. The method for identifying data items comprises receiving data indicating an aspect threshold, identifying a token that is associated with one or more data items related to the aspect threshold by the bound limit, and identifying data items having an aspect greater or less than the aspect threshold on the basis of the identified token.

The above embodiments are to be understood as illustrative examples. Further embodiments are envisaged, as follows.

It should be noted that the algorithm employed by the data item service 110 in order to identify the data items that have been updated since the correlator time (i.e. as described in steps 206 to 214) can be performed in a number of alternative ways, in some cases with one or more of the steps stated above omitted, whilst still providing the results described above. A number of these alternative versions of this algorithm will now be described, and it will be appreciated that one or more features of each of these alternatives may be combined to provide further alternative versions.

The binary search performed in step 210 may be used to identify the data item with the earliest last modified attribute after the correlator time minus the bound period (C−D), rather than the latest last modified attribute before that time. Therefore the update token of this identified token is the first update token. In this case the scan of the data items performed in step 212 may begin from all data items that have the update token immediately preceding the first update token.

The binary search performed in step 210 may be used to identify the data item with the earliest last modified attribute after the correlator time plus the bound period (C+D), rather than the latest last modified attribute before the correlator time minus the bound period (C−D). Therefore the update token of this identified token is the first update token. In this case the scan of the data items performed in step 212 may begin from all data items that have the update token immediately preceding the first update token. Additionally, the scan performed in step 212 may proceed backwards through the data items sorted by update token, i.e. from data items with more recent update tokens to ones with less recent update tokens. Additionally, once a data item with a last modified attribute before the correlator time minus the bound period (C−D) is found, the scan may be stopped in step 214 for data items that have update tokens with values less than or equal to the update token of this data item.

The binary search performed in step 210 may be used to identify the data item with the latest last modified attribute before the correlator time plus the bound period (C+D), rather than the earliest last modified attribute after the correlator time plus the bound period (C+D).

Thus in different alternatives of the algorithm, the first update token is associated with one or more updates performed relative to a given point in time (i.e. C+D or C−D) in that at least one of said one or more updates is performed before that point in time, or in that at least one of said one or more updates are performed after that point in time.

In each of the above cases identifying the first update token may include identifying a second update token. In each case the algorithm involves identifying a first update token that is associated with at least one update to one side of a given point in time (i.e. C+D or C−D), and identifying a second update token, adjacent to the first update token in the monotonic sequence, that is associated with at least one update to the other side of that point in time.

In each case the algorithm can include identifying an update token associated with at least one update performed after a point in time following the correlator time by the bound period (i.e. C+D), and identifying, on the basis of this update token, that all data items having update tokens following this update token have an update time after the correlator time (and so have been modified since the last synchronization).

In each case the algorithm can include identifying an update token associated with at least one update performed before a point in time preceding the correlator time by the bound period (i.e. C−D), and identifying, on the basis of this update token, that all data items having update tokens less than or equal to this update token have an update time before the correlator time (and so have not been modified since the last synchronization).

In any of the versions of the algorithm, the step of scanning the data items (i.e. step 212) may proceed until the end of the sorted (but not pruned) list of data items, i.e. without the data item service 110 stopping the scan in step 214. In this case at least some of the data items are eliminated from the scan by way of the preceding binary search (of step 210).

In any of the versions of the algorithms, a different type of search may be performed in step 210, as opposed to a binary search. Any search that tests the last modified attribute of only (for example) a non-contiguous subset of the sorted data items may provide an additional effect over the straightforward implementation described above.

In any of the versions of the algorithm, the step of pruning the sorted data items in step 208 may be omitted.

In an alternative to any of the embodiments described herein, a different scheme for generating a sequence of update tokens may be used. In one example, the data item service 110 may use its current time as the update token whenever it is necessary to associate a current update token with an updated or created data item. Provided that the amount of time taken between the data item service issuing a command to the operating system 122 (to store data item a updates or create a data item) and the operating system 122 acting on that command and recording the update time does not vary by more than the time bound, the embodiment may still function correctly. In the case where there is more than one data item service 110 for storing updates, provided that the clock used by each data item service is also within the time bound, the embodiments described may also be correctly applied. In each case the maximum clock variability plus the maximum operating system command processing time variability may be less than the time bound. This could for example be controlled by using the Network Time Protocol to synchronize the clock used by each data item service. In another alternative one or more data item services 110 may each (regularly, if appropriate) retrieve the current time from a time server, so that each of the data item services 110 is synchronised to the time of the time server. In any of these alternatives, it will be appreciated that the update token associated with current updates is at least partially determined on the basis of a server time, where the server time could be either that of a data item service or a time server.

It should be noted that if all the update token values of the data items of a given user are the same, the algorithm performed in steps 206 to 214 reduces to the implementation described above. Based on this observation, it is possible to construct a relatively seamless upgrade from a system that does not operate in accordance with embodiments described above to one that does, as is now described.

Firstly, from the moment that the upgrade is applied to a system, update tokens are associated with data items whenever data items are updated or created.

Secondly, when the upgraded system processes a request for updated data items of a given user, steps 206 to 214 are applied as described above, however for all data items that have not been associated with update tokens (i.e. as they have not been updated since the upgrade), treat all these data items as if they have been associated with a default update token. This default token has a value that is prior to that of all the update tokens in the sequence of update tokens that is used for data items of that user, e.g. the default update token could be update token 0, with all other tokens beginning from update token 1.

This results in efficient searches for correlator times after the upgrade, and searches equivalent to the straightforward implementation for correlator times before it.

In an alternative to any of the embodiments described herein, the data item service 110 may receive the data items sorted on the basis of their update token, e.g. from the operating system 122 or a program or other device that has sorted the retrieved data items before transmitting the to the data item service 110.

In an alternative to any of the embodiments described herein, when the data item service 110 performs the scanning phase, i.e. in order to discover and handle out-of-last-modified-order data items that are near the correlator time (in step 212), rather than re-requesting the last modified times of any data items whose last modified times were retrieved when the data item service 110 performed the binary search (in step 210), these last modified times may be cached by the data item service 110.

It will be appreciated that the data item storage service 100 may be used to store, for each of a plurality of users, a different plurality of data items. Each plurality of data items that is stored for a user may relate to personal information stored for that user, e.g. emails, messages e.g. Short Messaging Services messages, personal documents, social network (e.g. Facebook) posts, blog entries, instant messages, etc.

An application of the embodiments described is within a message storage and retrieval system e.g. for emails, text messages (SMS and/or MMS), instant messaging messages, social network messages, etc. In such a system, each user has one or more mailboxes, and each mailbox is represented by one or more directories in the file system provided by the operating system 122. Each message within the mailbox is represented by a data item stored in a file in one of those directories. The content of the message may be stored within the file contents of the file, and flags of the messages may be stored in the file name of the file. The filename also contains metadata such as the data item identifier, etc. New messages are deposited by adding data items, i.e. files. Updating a message's flags is achieved by renaming the corresponding file containing the message.

In this example, the next message identifier, i.e. next data item identifier, for a mailbox may be used as the monotonic quantity from which the update tokens for the mailbox are created.

Connected to the message storage and retrieval system are a number of clients. Each client acts on behalf of a single user, but there may be multiple clients acting on behalf of a single user (e.g., a mobile phone app client and a web browser client). Each client maintains a local cache of the user's mailbox, and uses this to present the messages in the mailbox to the user. It also allows the user to send new messages to other users, and to update flags on or delete existing messages in their own mailbox.

It will be appreciated that one or more of the servers and/or services of the above embodiments may be combined and/or removed and/or split across multiple computing platforms. A number of examples follow. The data item service 110 and storage server 120 could be the same server. A plurality of storage devices 124 for storing data items may be connected to or integrated with the storage server 120. The update service 170 could be integrated with the data item service 110. The update service 170 could be integrated with one or more of the client devices 140-160. The functionality provided by the data item service 110, storage server 120, operating system 122 and/or update service 170 may be distributed over a plurality of servers or computing devices.

It will be noted that as retrieving the last modified time (whether by e.g. a GETATTR command or by a READ-DIRPLUS command) may typically be intrinsically slow the embodiments described herein may provide an improvement in efficiency even where the data item service 110 runs on the same server as the operating system 122.

It will be noted that multiple storage servers 120 could be provided, each of which may store data items for a different subset of the plurality of users of the data item storage system 100.

It will be noted that multiple, separate operating systems 122 may be provided on multiple storage servers 120, provided that these separate operating systems 122 can synchronise their clocks (i.e. agree on update times).

The data item service 110, storage server 120, update service 170 and client devices 140, 150, and 160 may each be a computing device such as a mobile phone, smartphone, a personal digital assistant (PDA), a computer, etc., though in embodiments the data item service 110, storage server 120, update service 170, are or incorporate a computer. FIG.

4 schematically illustrates components of a computing device 400 in accordance with embodiments.

The computing device 400 includes a processor 402 and components connected to a system bus 404, where these components may include a non-volatile storage device 406, random access memory 408, and network interface 410. The computing device may also include a user input interface and a graphics processing component that is connected to a display.

The processor 402 may be configured to execute computer instructions for one or more computer programs including an operating system 420 and other programs 430. For example for the data item service 110 these other programs may include the functionality provided by the data item service 110 described above. For the other devices described above these other programs may include any other programs for providing the respective functionality described above.

The network interface 410 (or plurality of such interfaces) of the computing device 400 allows programs running on the processor 402 of the computing device 400 to transmit and receive data to and from a number of other devices and systems via a communications network (or a plurality of such networks).

The network interface 410 (or the plurality of such interfaces) may include a radio access network interface (or a plurality of such interfaces) that is able to communicate with a wireless access node such as a base station or a wireless access point that provides access to a communications network or a plurality of such networks. The network interface 410 (or plurality of such interfaces) may be able to connect to the wireless access node using one or more of a number of radio access technologies including Global System for Mobile Communications (GSM), Universal Mobile Telecommunications System (UMTS), Long Term Evolution (LTE), fixed wireless access (such as IEEE 802.16 ("WiMax")), and wireless networking (such as IEEE 802.11 ("WiFi")). The communications network and/or wireless access node may also provide access to the Internet. The network interface 410 (or the plurality of such interfaces) may also include a modem and/or an Ethernet card or interface for use with a corresponding communications network, or networks, such as the Internet and/or a private data communications network.

In an alternative to any of the embodiments described herein, when the data item service 110 performs the scanning phase, i.e. in order to discover and handle out-of-last-modified-order data items that are near the correlator time (in step 212), rather than determining whether the retrieved last modified attribute is less or equal to the correlator time, the data item service 110 may determine whether the retrieved last modified attribute is less than the correlator time. This may be done for some operating systems 122 that have a low resolution clock which cannot be used to guarantee that the last modified attributes are strictly monotonic. In this case a less than operation may be performed here, and the data item service 110 may thus sometimes indicate that a data item may have changed when in fact it has not—this is acceptable provided that the converse does not occur. The bound period may be greater than the clock resolution of the operating system 122 in this case.

In an alternative to any of the embodiments described herein, a data item may be stored such that it is split across a plurality of files, or it may be included in one file along with one or more other data items. In another alternative a data item may be included in the file name of a file, rather than in the file contents of the file. In each case, the update token of the data item may be stored in the file name of the file (or at least one of the files) in which the data item is stored.

In an alternative to any of the embodiments described herein, there may be a plurality of data item services 110. Some/all these data item services 110 may service different users and/or different clients. Some/all these data item services may store updates to data items on behalf of different sources e.g. different clients, or other devices that add or modify data items (e.g. one or more update services 170). It will be appreciated that by using the operating system 122 to record the times of updates to data items and using the update tokens associated with data items as an approximation to these recorded times, the effects of any of the described embodiments may be achieved.

In an alternative to any of the embodiments described herein, tokens similar to the update tokens described may be used according to the teaching of the embodiments above to provide an approximation to a (different) aspect of a data item that may be expensive (e.g. computationally, or otherwise) to read, where both the tokens and that aspect of a data item are monotonic, and where their monotonic orders agree within a fixed or at least approximate bound limit. These alternative embodiments involve identifying those data items that have an aspect greater or less than an aspect threshold.

An example of such an alternative would be to use tokens to approximate an aspect of a data item that is a file, such as the aspect of the number of words in a file. Tokens for data items could be generated on the basis of the size of each file, which may be relatively quickly determined by reading this information from the file system containing that file, and thus is more quickly determined than the number of words in the file (which can typically only be determined by reading the contents of the file). In this example the teaching of the embodiments above may be used to allow tokens to be used to enable queries such as "find all documents with less than 500 words".

Another example of such an alternative would be to use tokens to approximate an aspect of a data item that is a table in a database, such as the aspect of the number of rows in the table. Again tokens for data items could be generated on the basis of the size of each table, which may be more quickly determined than actually counting the number of rows in each table. In this example the teaching of the embodiments above may be used to allow tokens to be used to enable queries such as "find all database tables with more than 1000 rows".

Yet another example of such an alternative would be to use tokens to approximate an aspect of a data item that is a surface or object in a computer graphics (e.g. 3D) scene, such as the aspect of whether the object is behind or in front of a particular plane. In this case tokens could be generated by each object or surface with a simpler object that is boundedly far away from it at each point. The objects may then be sorted according to the approximations (e.g. positions of the simpler objects), and then only those objects that are determined to be close to the plane have their individual points tested.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for identifying updated data items in a plurality of data items stored at a data item storage system, the method comprising:
 receiving, at the data item storage system, data indicating a last synchronization time,
  wherein each data item in the plurality of data items has an associated update time,
  wherein identifying updated data items comprises identifying those data items in the plurality of data items that have an update time later than the last synchronization time,
  wherein the data items are updated such that each data item is associated with one of a plurality of update tokens, each update token being associated with updates performed up to an end of a respective bound period that commences at a time at which the update token is superseded by a successive update token,
  wherein information relating to each data item is stored using at least one of a plurality of files in a network file system, each file having a file name, file content and a last modified time that corresponds to the update time of said data item, wherein information relating to the update token of each data item is stored in the file name of at least one of the plurality of files storing the information relating to that data item, and
  wherein the update tokens are allocated successively in a monotonic sequence;
 identifying, at the data item storage system, an update token that is associated with one or more updates performed relative to a point in time related to the last synchronization time by the bound period; and
 identifying, at the data item storage system, data items having an update time after said last synchronization time based on said identified update token.

2. The method according to claim 1, wherein the identified update token is associated with one or more updates performed relative to said point in time in that at least one of said one or more updates is performed before said point in time.

3. The method according to claim 1, wherein the identified update token is associated with one or more updates performed relative to said point in time in that at least one of said one or more updates are performed after said point in time.

4. The method according to claim 1, wherein identifying said update token comprises:
 identifying a first update token that is associated with at least one update to one side of said point in time; and
 identifying a second update token, adjacent to said first update token in said monotonic sequence, that is associated with at least one update to the other side of said point in time.

5. The method according to claim 1, further comprising:
 identifying an update token associated with at least one update performed after a point in time following said last synchronization time by said bound period; and
 identifying, on the basis of this update token, that all data items having update tokens greater than or equal to this update token have an update time after said last synchronization time.

6. The method according to claim 1, further comprising:
 identifying an update token associated with at least one update performed before a point in time preceding said last synchronization time by said bound period; and
 identifying, on the basis of this update token, that all data items having update tokens less than or equal to this update token have an update time before said last synchronization time.

7. The method according to claim 1, further comprising:
 retrieving the data items identified as having an update time after said last synchronization time; and
 transmitting information relating to the retrieved data items.

8. The method according to claim 1, wherein a given data item is stored in at least one of the file name and the file contents of the file that stores information relating to the data item.

9. The method according to claim 1, further comprising, for a given request:
 receiving from a client device said last synchronization time in a request for update information in relation to the plurality of data items; and
 responding to said request for update information by transmitting to said client device information relating to the data items identified as having an update time after said last synchronization time,
 wherein requests for update information in relation to the plurality of data items are received from a plurality of client devices.

10. The method according to claim 9, wherein responding to said request for update information additionally comprises transmitting a new last synchronization time to the client device, wherein said new last synchronization time is determined at least partly on the basis of the update time of at least one of the data items identified as having an update time after said last synchronization time.

11. The method according to claim 1, further comprising:
 receiving at a first time an update token associated with current updates;
 receiving update information relating to a data item; and
 if the time elapsed since said first time is less than said bound period, associating said data item with the received update token and storing the update to the data item, wherein said update to the data item is stored such that the time when said update is stored is recorded as the data item's update time.

12. The method according to claim 11, wherein the update token associated with current updates is at least partially determined on the basis of a next new data item identifier.

13. The method according to claim 11, wherein the update token associated with current updates is at least partially determined on the basis of a server time.

14. The method according to claim 1, wherein identifying an update token that is associated with one or more updates performed relative to said point in time comprises, for each update token: testing the update time of at most one data item having said update token.

15. The method according to claim 1, wherein identifying an update token that is associated with one or more updates performed relative to said point in time comprises: receiving said plurality of data items sorted on the basis of their respective update tokens.

16. The method according to claim 15, wherein identifying an update token that is associated with one or more updates performed relative to said point in time further comprises: performing a binary search on at least some of said sorted data items on the basis of at least one of their respective update tokens and their respective update times.

17. The method according to claim 15, wherein identifying an update token that is associated with one or more updates performed relative to said point in time further comprises: testing a non-contiguous subset of the sorted data items in order to identify at least one of a first sorted data item and a second data item, wherein the first sorted data item has an update time to one side of said point in time and said second sorted data item has an update time to the other side of said point in time.

18. The method according to claim 17, wherein testing a non-contiguous subset comprises testing the update times of the sorted data items in said subset, and wherein said first sorted data item has the latest update time of the data items in said subset that is before said point in time, and said second sorted data item has the earliest update time of the data items in said subset that is after said point in time.

19. The method according to claim 1, wherein each of a subset of data items are not associated with an update token, comprising: associating each data item in said subset with a default update token, said default update token preceding the update tokens in said sequence that are associated with data items not in said subset.

20. A method for identifying data items in a plurality of data items stored at a data item storage system, the method comprising:
  receiving, at the data item storage system, data indicating an aspect threshold,
  wherein each data item in said plurality of data items has an associated aspect,
  wherein identifying data items comprises identifying those data items in said plurality that have an aspect greater or less than an aspect threshold,
  wherein said data items are associated with one of a plurality of tokens, each token being associated with a respective bound limit, tokens being allocated successively in a monotonic sequence, and
  wherein information relating to each data item is stored using at least one of a plurality of files in a network file system, each file having a file name, file content and an aspect that corresponds to the aspect of said data item, wherein information relating to the token of each data item is stored in the file name of at least one of the plurality of files storing the information relating to that data item;
  identifying, at the data item storage system, a token that is associated with one or more data items related to said aspect threshold by the bound limit, and
  identifying data items having an aspect greater or less than said aspect threshold based on the identified token.

21. A computer program product comprising a non-transitory computer-readable storage medium having computer readable instructions stored thereon, the computer-readable instructions being executable by a computerized device to cause the computerized device to perform a method for identifying updated data items in a plurality of data items stored at a data item storage system, the method comprising:
  receiving, at the data item storage system, data indicating a last synchronization time,
    wherein each data item in the plurality of data items has an associated update time,
    wherein identifying updated data items comprises identifying those data items in the plurality of data items that have an update time later than the last synchronization time,
    wherein the data items are updated such that each data item is associated with one of a plurality of update tokens, each update token being associated with updates performed up to an end of a respective bound period that commences at a time at which the update token is superseded by a successive update token,
    wherein information relating to each data item is stored using at least one of a plurality of files in a network file system, each file having a file name, file content and a last modified time that corresponds to the update time of said data item, wherein information relating to the update token of each data item is stored in the file name of at least one of the plurality of files storing the information relating to that data item, and
    wherein the update tokens are allocated successively in a monotonic sequence;
  identifying, at the data item storage system, an update token that is associated with one or more updates performed relative to a point in time related to the last synchronization time by the bound period; and
  identifying, at the data item storage system, data items having an update time after said last synchronization time based on said identified update token.

22. A computer program product comprising a non-transitory computer-readable storage medium having computer readable instructions stored thereon, the computer-readable instructions being executable by a computerized device to cause the computerized device to perform a method for identifying data items in a plurality of data items at a data item storage system, the method comprising:
  receiving, at the data item storage system, data indicating an aspect threshold,
  wherein each data item in said plurality of data items has an associated aspect,
  wherein identifying data items comprises identifying those data items in said plurality that have an aspect greater or less than an aspect threshold,
  wherein said data items are associated with one of a plurality of tokens, each token being associated with a respective bound limit, tokens being allocated successively in a monotonic sequence, and
  wherein information relating to each data item is stored using at least one of a plurality of files in a network file system, each file having a file name, file content and an aspect that corresponds to the aspect of said data item, wherein information relating to the token of each data item is stored in the file name of at least one of the plurality of files storing the information relating to that data item;
  identifying, at the data item storage system, a token that is associated with one or more data items related to said aspect threshold by the bound limit, and
  identifying data items having an aspect greater or less than said aspect threshold based on the identified token.

23. An apparatus for identifying updated data items in a plurality of data items at a data item storage system, the apparatus comprising:
  a processor; and
  a memory including computer program code,
  wherein the processor is configured to execute the computer program code in order to cause the apparatus to:
  receive, at the data item storage system, data indicating a last synchronization time,
    wherein each data item in the plurality of data items has an associated update time, wherein identifying updated data items comprises identifying those data items in the plurality of data items that have an update time later than the last synchronization time, wherein the data items are updated such that each data item is associated with one of a plurality of update tokens, each update token being associated with updates performed up to an end of a respective bound period that commences at a time at which the update token is superseded by a successive update token, wherein information relating to each data item is stored using at least one of a plurality of files in a network file system, each file having a file name, file content and a last modified time that corresponds to the update time of said data item, wherein information relating to the update token of each data item is stored in the file name of at least one of the plurality of files storing the information relating to that data item, and wherein the update tokens are allocated successively in a monotonic sequence;

identify, at the data item storage system, an update token that is associated with one or more updates performed relative to a point in time related to the last synchronization time by the bound period; and identify, at the data item storage system, data items having an update time after said last synchronization time based on said identified update token.

24. An apparatus for identifying data items in a plurality of data items at a data item storage system, the apparatus comprising:

a processor; and a memory including computer program code, wherein the processor is configured to execute computer program code in order to cause the apparatus to:

receive, at the data item storage system, data indicating an aspect threshold, wherein each data item in said plurality of data items has an associated aspect, wherein identifying data items comprises identifying those data items in said plurality that have an aspect greater or less than an aspect threshold, wherein said data items are associated with one of a plurality of tokens, each token being associated with a respective bound limit, tokens being allocated successively in a monotonic sequence, and wherein information relating to each data item is stored using at least one of a plurality of files in a network file system, each file having a file name, file content and an aspect that corresponds to the aspect of said data item, wherein information relating to the token of each data item is stored in the file name of at least one of the plurality of files storing the information relating to that data item;

identify, at the data item storage system, a token that is associated with one or more data items related to said aspect threshold by the bound limit, and identify data items having an aspect greater or less than said aspect threshold based on the identified token.

\* \* \* \* \*